United States Patent [19]
Aoi et al.

[11] Patent Number: 5,942,683
[45] Date of Patent: *Aug. 24, 1999

[54] APPARATUS FOR MEASURING GAS FLOW RATE IN A BYPASS PASSAGE AND HAVING A PASSAGE RESTRICTION PORTION DOWNSTREAM OF THE DETECTING ELEMENT

[75] Inventors: Hiroshi Aoi, Clemson, S.C.; Koichi Fujiwara, Gunma, Japan; Fumikazu Miyamoto, Gunma, Japan; Jun Arai, Gunma, Japan

[73] Assignee: Unisia Jecs Corporation, Atsugi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/867,761

[22] Filed: Jun. 3, 1997

[30] Foreign Application Priority Data

Jun. 12, 1996 [JP] Japan ..................... 8-172954

[51] Int. Cl.$^6$ ................. G01F 1/68; G01F 5/00
[52] U.S. Cl. ................ 73/202.5; 73/202; 73/204.21; 73/204.26
[58] Field of Search .............. 73/204.26, 204.21, 73/204.22, 202, 202.5, 118.2

[56] References Cited

U.S. PATENT DOCUMENTS

| | | | |
|---|---|---|---|
| 4,517,837 | 5/1985 | Oyama et al. | 73/202.5 |
| 4,709,581 | 12/1987 | Nishimura et al. | 73/202 |
| 5,056,362 | 10/1991 | Ang et al. | 73/204.26 |
| 5,396,795 | 3/1995 | Araki | 73/204.26 |
| 5,672,822 | 9/1997 | Sawada et al. | 73/202.5 |
| 5,712,425 | 1/1998 | Hetch et al. | 73/202.5 |

FOREIGN PATENT DOCUMENTS

| | | |
|---|---|---|
| 0 295 647A1 | 12/1988 | European Pat. Off. . |
| 4338 891A1 | 9/1994 | Germany . |
| 4407 209A1 | 9/1995 | Germany . |
| 61-65053 | 4/1986 | Japan . |

*Primary Examiner*—Harshad Patel
*Attorney, Agent, or Firm*—Foley & Lardner

[57] ABSTRACT

An apparatus for measuring gas flow rate is comprised of a pipe body whose inside space performs as a passage for flowing measured gas. A housing including a generally U-shaped bypass passage is integrally formed with the pipe body. A plate-type flow-rate detection element is disposed in a first passage of the bypass passage, and a passage restricting portion is disposed in a second passage of the bypass passage downstream of the first passage. The inlet portion of the bypass passage is disposed in the vicinity of an axial center of the pipe body, and the outlet port of the bypass passage is disposed in the vicinity of a pipe wall of the pipe body. Therefore, the influence of a pulsating flow to the flow-rate detection element is decreased, and the high-accuracy detecting of gas flow-rate is executed.

10 Claims, 10 Drawing Sheets

APPARATUS FOR MEASURING GAS FLOW RATE IN A BYPASS PASSAGE AND HAVING A PASSAGE RESTRICTION PORTION DOWNSTREAM OF THE DETECTING ELEMENT

BACKGROUND OF THE INVENTION

1. Field of the Invention

The present invention relates to a gas flow-rate measuring apparatus which is preferable in use for detecting an intake-air flow-rate of a vehicular engine.

2. Description of the Related Art

Generally a vehicular engine of a fuel injection type is provided with an apparatus for accurately measuring a flow-rate of intake air in order to derive the amount of fuel injection with high accuracy. Japanese Patent Provisional Publication No. 61-65053 discloses a gas flow-rate measuring apparatus which is constituted by a pipe body, a housing including a bypass passage and a flow-rate detection element. Gas to be detected by this apparatus is led to the pipe body to which the housing is installed. The housing is provided with the bypass passage having a circular passage cross-section so that part of the gas flows through the bypass passage. The flow-rate detection element of a bobbin-type hot-wire probe is installed in the bypass passage. A passage length of the bypass passage is formed longer than that of a main passage of the pipe body in order to reduce the influence of the pulsating flow caused by the engine operation. More particularly, the influence of the pulsating flow is suppressed by generating a pressure difference at the bypass passage with respect to a main passage. Further, the flow-rate detection element is disposed at a passage restricting portion in the bypass passage.

However, the pulsating flow of the intake air largely affects the passage restricting portion of the bypass passage such that the detection error of the hot-wire type flow-rate detection element becomes large. Such error due to the pulsating flow is increased according to the increase of the magnitude of the pulsating flow, as show by a dotted line in FIG. 13.

SUMMARY OF THE INVENTION

It is an object of the present invention to provide an improved apparatus for measuring gas flow-rate which apparatus is arranged to decrease the error due to pulsating flow in flow-rate detection.

An apparatus according to the present invention is for measuring gas flow-rate and comprises a pipe body, a housing, a bypass passage, a passage restricting portion and an flow-rate detection element. The pipe body has an inside space performing as a passage for flowing gas to be measured. The housing is disposed at the inside space of the pipe body so as to diametrically project from a pipe wall toward a center axis of the pipe body. The bypass passage, through which part of the gas to be measured flows, is formed at the housing. The passage restricting portion is disposed in the bypass passage so as to decrease a passage cross-sectional area of the bypass passage. The flow rate detection element is disposed in the bypass passage and upstream of the passage restricting portion.

DETAILED DESCRIPTION OF THE INVENTION

Referring to FIGS. 1 to 13, there is shown an embodiment of an apparatus for measuring gas flow-rate according to the present invention. An intake-air flow-rate measuring apparatus for a vehicular engine is disclosed in this embodiment.

The intake-air flow-rate measuring apparatus comprises a pipe body 1 constituting a main body thereof. The pipe body 1 is formed in a cylinder made of synthetic resin material or metal material. The pipe body 1 is constituted by a pipe wall 1A whose inside space functions as a passage 2 for flowing intake air, a flange portion 1B formed at one end of the pipe wall 1A, and a cylindrical connecting portion 1C formed at the other end of the pipe wall 1A. The pipe body 1 is disposed in an intake pipe of the engine. The flange portion 1B is connected to an air-cleaner, and the connecting portion 1C is connected to an air-intake passage (not shown) or throttle valve (not shown). The air purified by the air-cleaner is fed to cylinders of the engine through the pipe body 1 in accordance with reciprocating movements of the cylinders.

An installation port 3 is formed into a small-cylinder shape which projects from the pipe wall 1A outwardly in diametrical direction. The installation port 3 is installed at a generally intermediate portion of the pipe wall 1A. An element supporting member 13 is inserted into the installation port 3 and is fixed thereto. A housing 4 formed into a vertically elongated rectangular shape is integral with the pipe body 1. The housing 4 is projected from the pipe wall 1A toward the axial center O—O of the passage 2 inwardly and is located at a position opposite to the installation port 3. The housing 4 is constituted by a front surface 4A located at an upstream side with respect to the flow of the intake air, a back surface 4B of a downstream side, a left surface 4C, a right surface 4D, and a top surface 4E.

Figure 4:
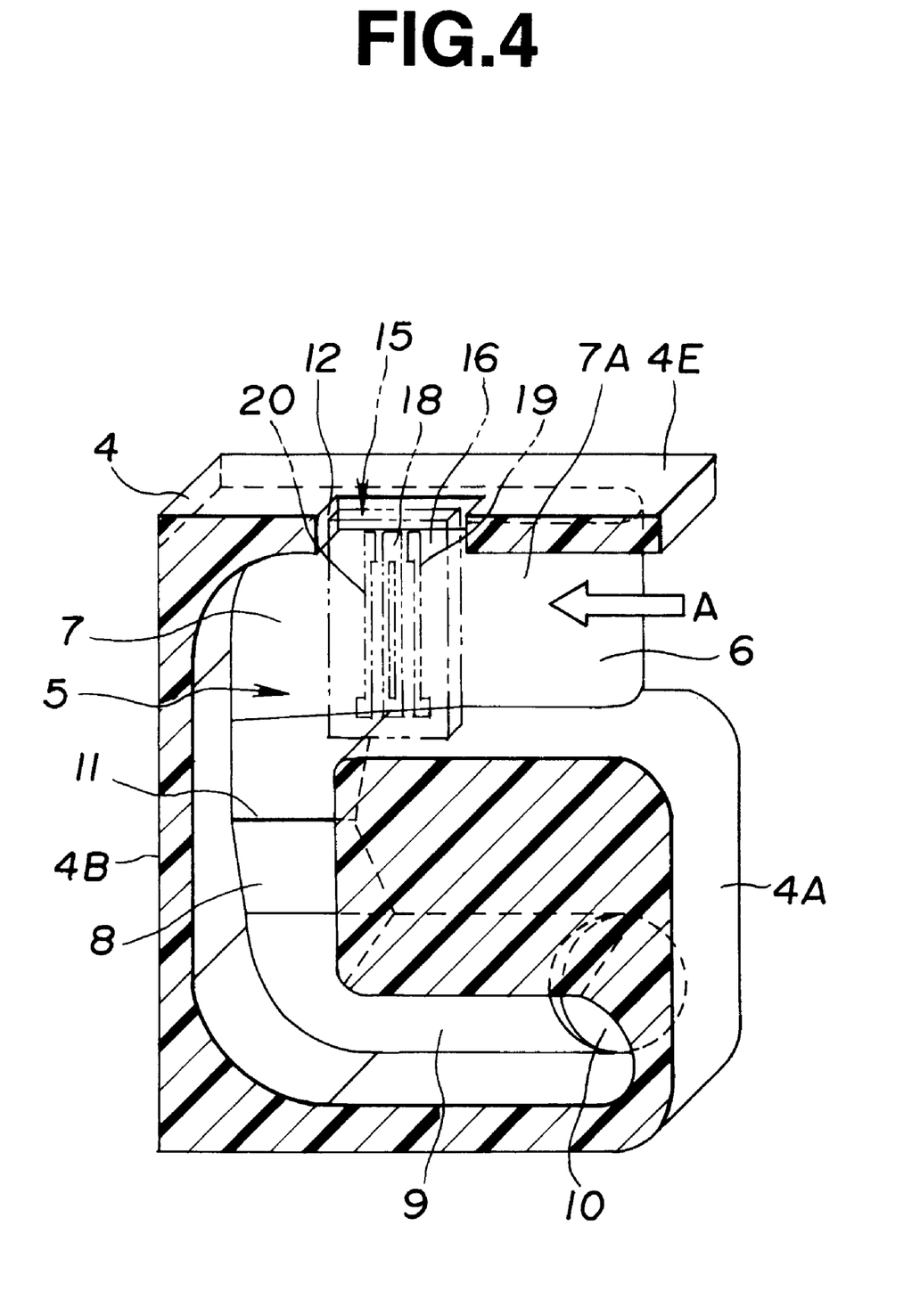
FIG. 4 is a perspective view of a vertically cut housing of FIG. 1.
Figure 8:
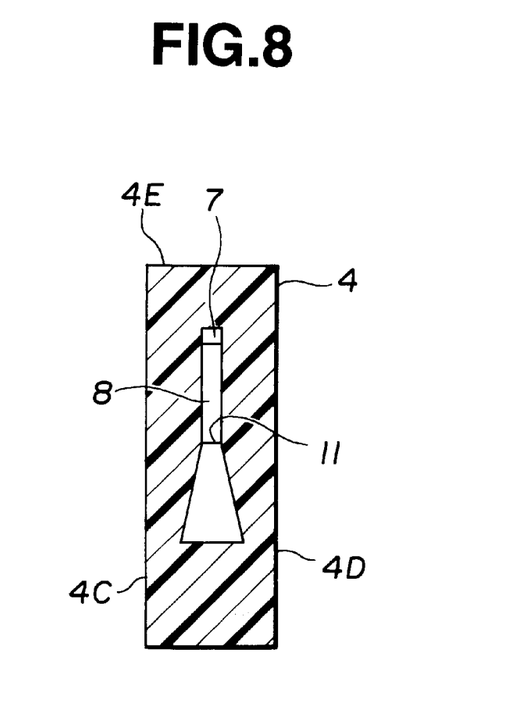
FIG. 8 is a cross-sectional view taken along lines VIII—VIII of FIG. 5.

The housing 4 is provided with a bypass passage which is formed into a generally U-shape as shown in FIGS. 4 and 8. The bypass passage 5 is constituted by an inlet port 6, a first passage 7, a second passage 8, a third passage 9, and a pair of outlet ports 10 and 10 which are continuously connected in series in order of mention. The inlet port 6 is located in the vicinity of the axial center O—O of the passage 2 and at the front surface 4A of the housing 4 and is opened toward the upstream side of the passage 2. The first passage 7 connected to the inlet port 6 is located in the vicinity of the axial center O—O and is extended in the axial direction of the pipe body 1 from the upstream side to the downstream side of the passage 2. The second passage 8 is connected with the first passage 7 and is extended from a portion near the axial center O—O and the back surface 4B toward an outside portion in the pipe wall 1A of the pipe body 1. The third passage 9 is connected with the second passage 8 and located at diametrically outer side of the pipe body 1. The third passage 9 is extended from a downstream side to an upstream side in the passage 2 so as to be parallel with the axial line. The pair of outlet ports 10 and 10 are located at a diametrically outer side in the pipe body 1 and are opened at the side surfaces 4C and 4D.

Figure 6:
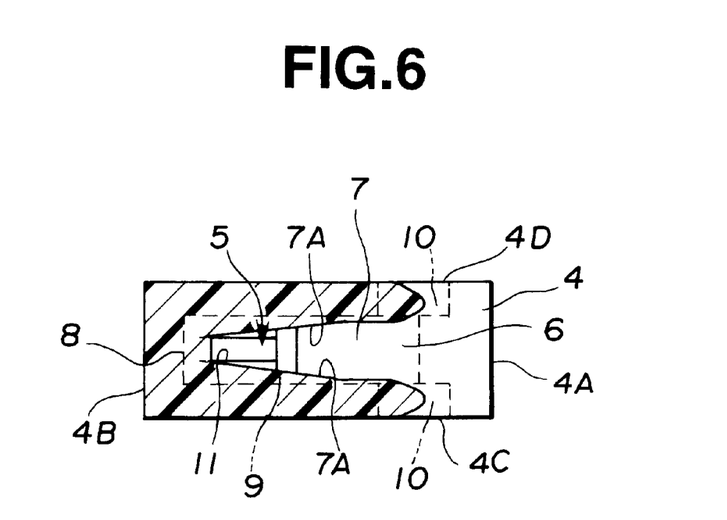
FIG. 6 is a cross sectional view taken along lines VI—VI of FIG. 5.
Figure 7:
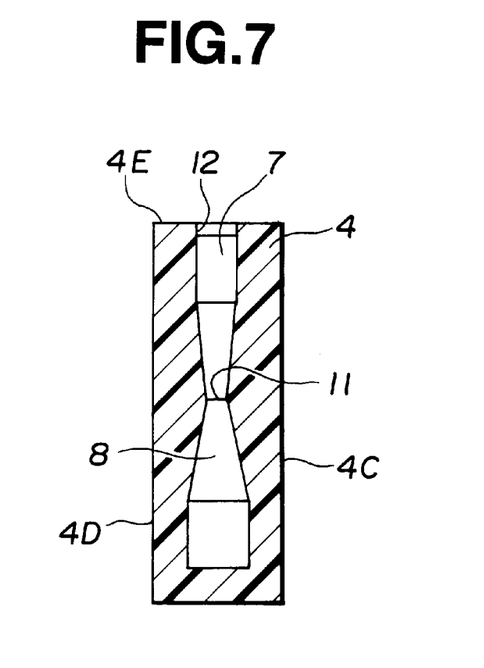
FIG. 7 is a cross-sectional view taken along lines VII—VII of FIG. 5.

As shown in FIG. 6, the first passage 7 communicated with the inlet port 6 is defined by a pair of oblique surfaces 7A and 7A so that a passage cross-sectional area of the first passage 7 is gradually decreased toward the downstream side. An element inserting port 12 is formed at the upper surface 4E. A passage restricting portion 11 is disposed in the second passage 8 in order to restrict or choke the bypass passage 5. Since a portion of the second passage 8 located at the back surface 4B side of the axial center O—O is restricted or choked by the oblique surfaces 7A and 7A, a portion of the second passage 8 between the axial center O—O and the passage restricting portion 11 is restricted or choked in passage cross-sectional area such that the shape of the passage cross-section is changed from a trapezoid to a rectangle by decreasing the length of a bottom side of the front surface 4A.

A passage cross-sectional area S0 defined by the passage restricting portion 11 is set smaller than a passage cross-sectional area S1 of the first passage 7 to which a plate-type flow-rate detection element 15 is disposed. The passage cross-sectional area S1 is a cross-sectional area which is obtained by subtracting the cross-section of the flow-rate detection element 15 from the passage cross-sectional area of the first passage 7.

Therefore, the ratio between the flow-rate flowing through the passage 2 and the flow-rate flowing through the bypass passage 5 is determined such that the flow-rate, whose ratio to the flow-rate of the intake air flowing through the passage 2 is always constant, flows through the bypass passage 5. Hereinafter, the ratio between the flow-rate flowing through the passage 2 and the flow-rate flowing through the bypass passage 5 is called as a bypass-flow ratio.

Figure 11:
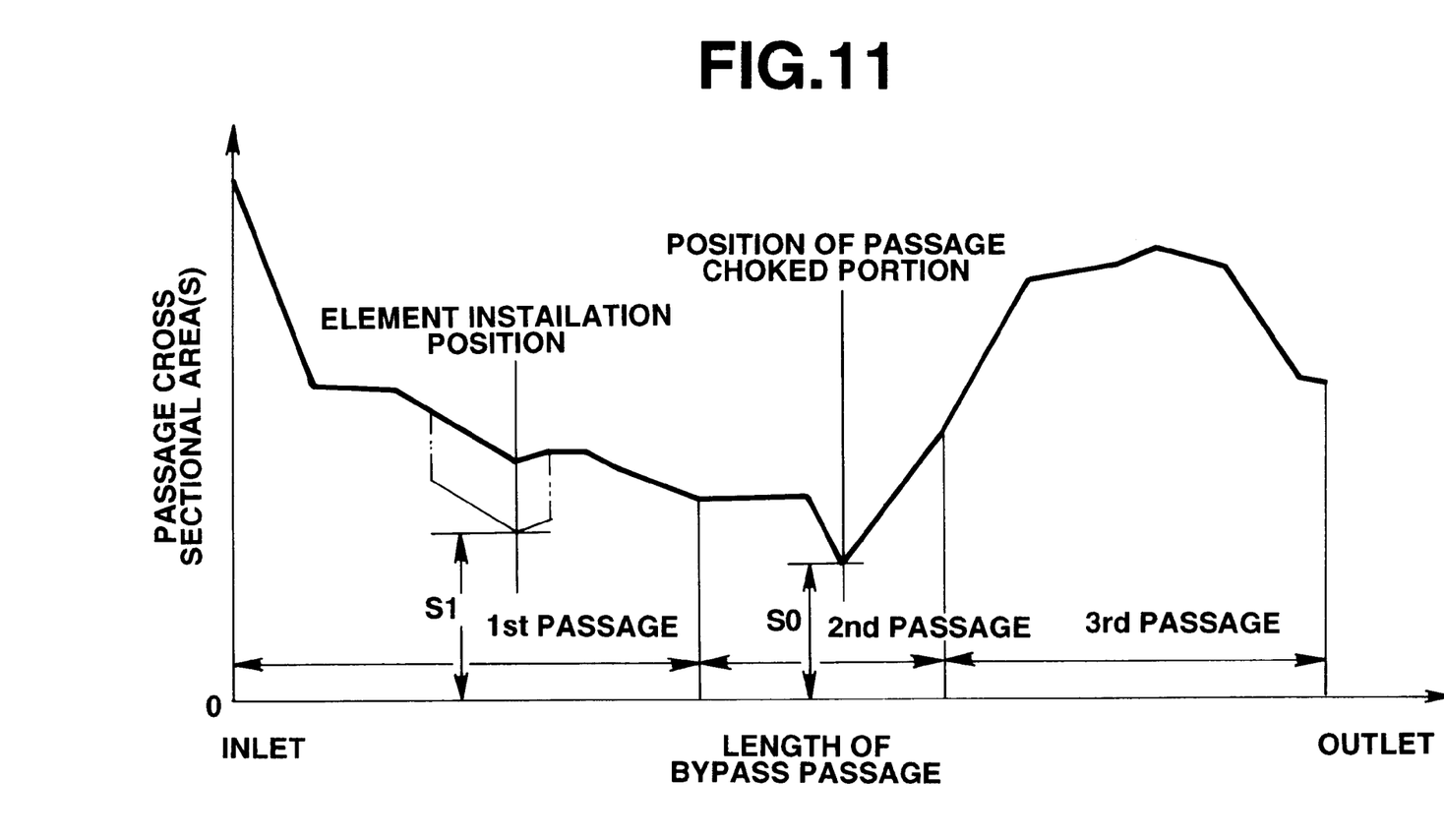
FIG. 11 is a graph which shows the relationship between the passage cross-sectional area and the length of the bypass passage.

Further, the bypass passage 5 is formed such that the relationship between the passage length and the passage cross-sectional area S from the inlet port 6 to the outlet ports 10, 10 is represented by a graph shown in FIG. 11. That is, the passage cross-section S at the inlet port 6 is formed greatest in the bypass passage 5, and the passage cross-sectional area at the element installation position is S1. Then, the passage cross-sectional area is gradually decreased from the element installation position to the passage restricting portion 11. The passage cross-section area at the passage restricting portion 11 is So, and then the passage cross-section area S is radically increased from the downstream side of the passage restricting portion 11. At the outlet port 10, the passage cross-section area is again choked or decreased.

An element inserting port 12 is formed into a rectangular shape by opening the upper surface 4E of the housing 4. The element inserting port 12 is directly communicated with the first passage 7 defined by the oblique surfaces 7A and 7A. The plate-type flow-rate detection element 15 is inserted into the element inserting port 12. An element supporting member 13 is formed into a stepped column. A connector 13B is connected to a base end portion of the element supporting member 13 through a collar 13A. The element supporting member 13 has a circuit receiving portion 13C of the rectangular shape which portion is covered with a cover 13C1 made of resin. A wall portion 13D is formed at a tip end portion of the circuit receiving portion 13C. The flow-rate detection element 15 is installed to the element supporting member 13 so as to project from the wall portion 13D. By contacting the wall portion 13D of the element supporting member 13 with the upper surface 4E of the housing 4, the first passage 7 is sealed.

A circuit unit 14 is received in the circuit receiving portion 13C of the element supporting member 13. The circuit unit 14 functions to execute a communication with the plate-type flow-rate detection element 15 through electric signals. That is, the circuit unit 14 includes a heater control circuit for controlling a heater 18 of the plate-type flow-rate detection element 15, an amplifier circuit for amplifying detection signals of resistance thermometers 19 and 20, and a reverse-flow detection circuit.

Figure 9:
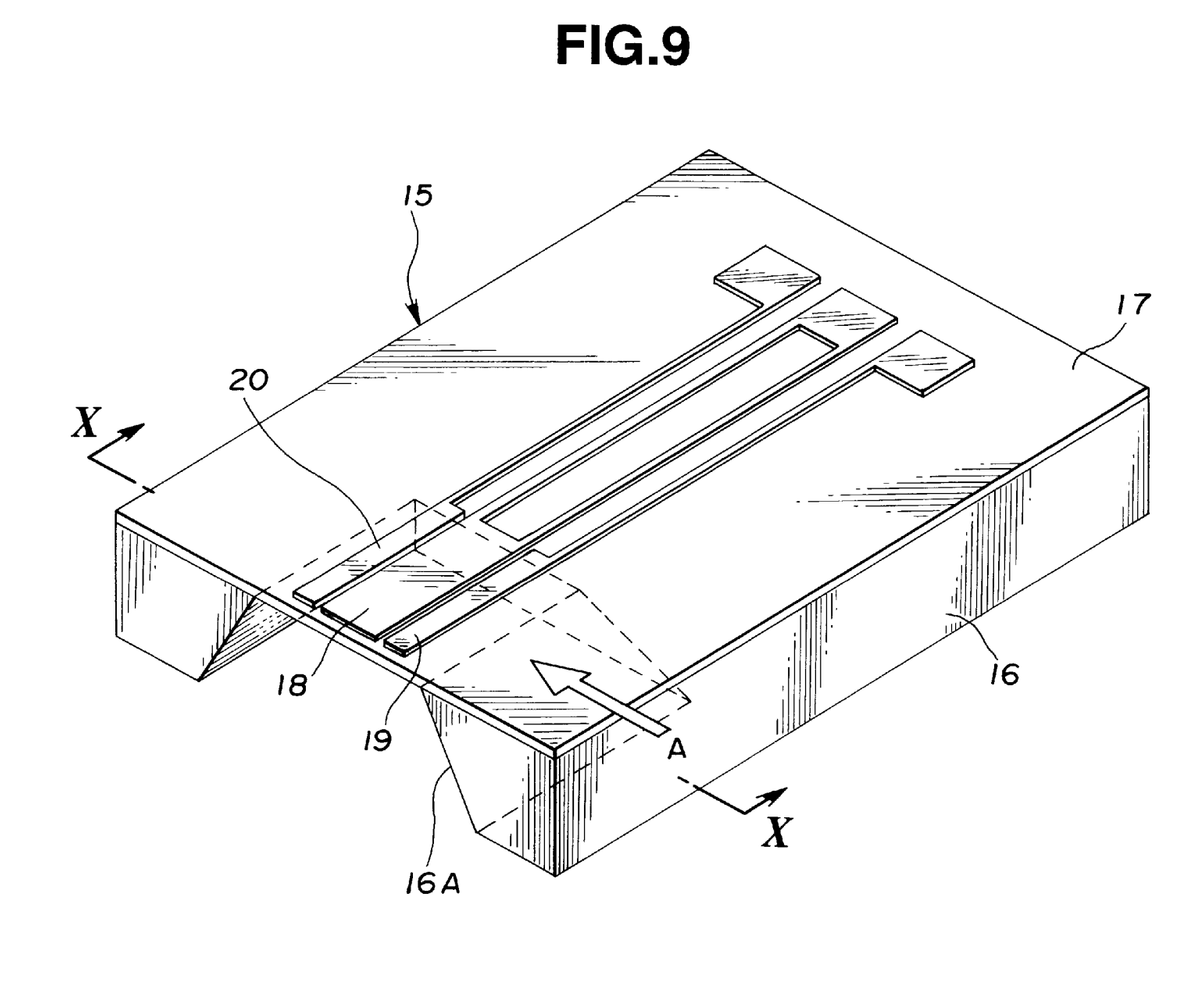
FIG. 9 is a perspective view of a plate-type flow-rate detection element applied to the embodiment according to the present invention.
Figure 10:
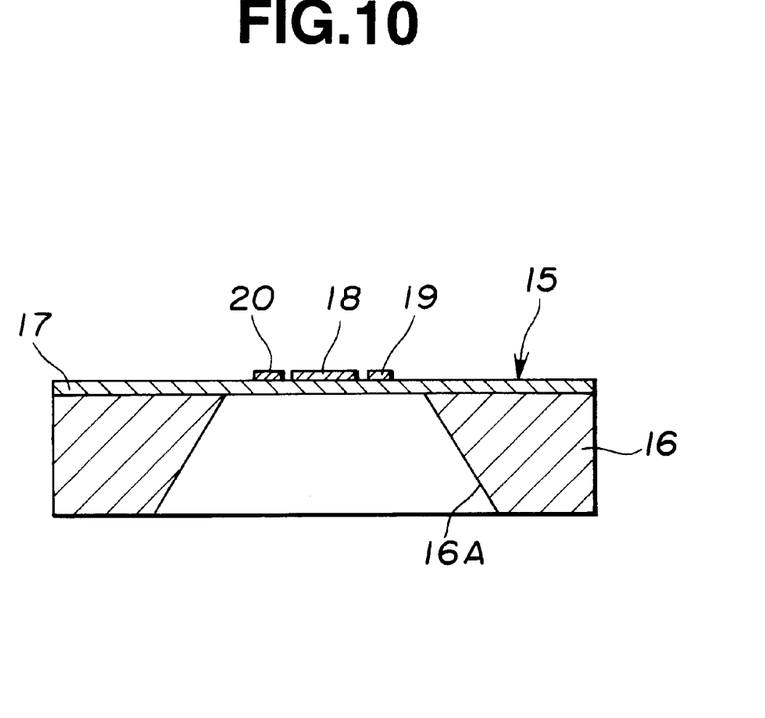
FIG. 10 is a cross-sectional view taken along lines X—X of FIG. 9.

The plate-type flow-rate detection element 15 installed at the tip end portion of the element supporting member 13 is constituted by a silicon base plate 16, an insulation film 17, a heater 18 and the resistance thermometers 19 and 20, as shown in FIGS. 9 and 10. The silicon base plate 16 has a worked hole 16A of a trapezoid at an intermediate and lower surface and is covered with the insulation film 17, such as an oxide film ($SiO_2$) or a Nitride film (SiN). The heater 18 is formed at a position corresponding to the worked hole 16A through the insulation film 17 by vaporizing Platinum, for example, forming a film of about 2 $\mu$m thickness. The resistance thermometers 19 and 20 are films which are formed by vaporizing as similar to that of the heater 18, and are respectively located at right and left sides of the heater 18. The worked hole 16A of the silicon base plate 16 is formed into a trapezoid shape by applying anisotropic etching to the silicon base plate 16.

Figure 1:
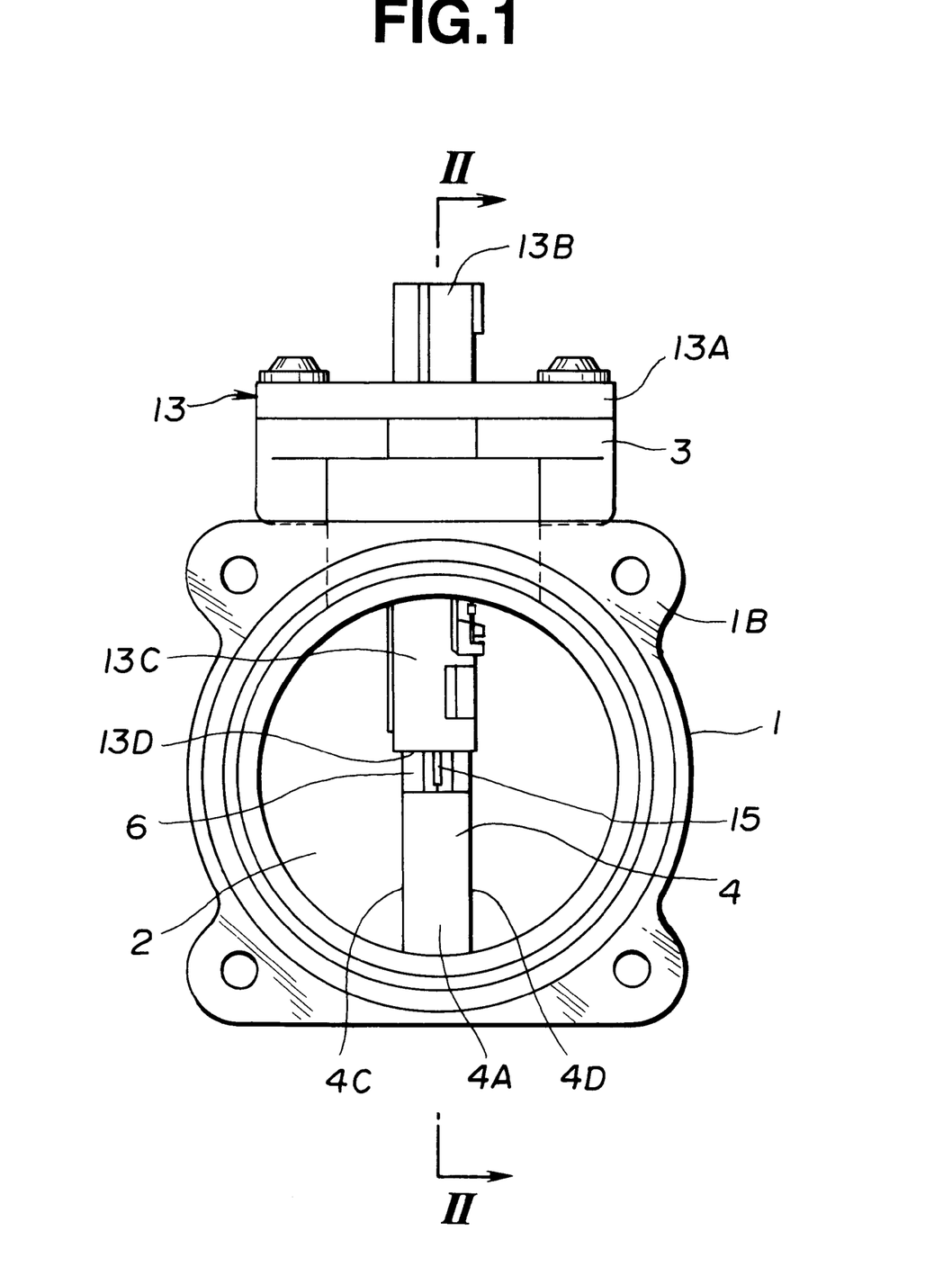
FIG. 1 is a front view which shows an intake-air flow-rate measuring apparatus of an embodiment according to the present invention.
Figure 2:
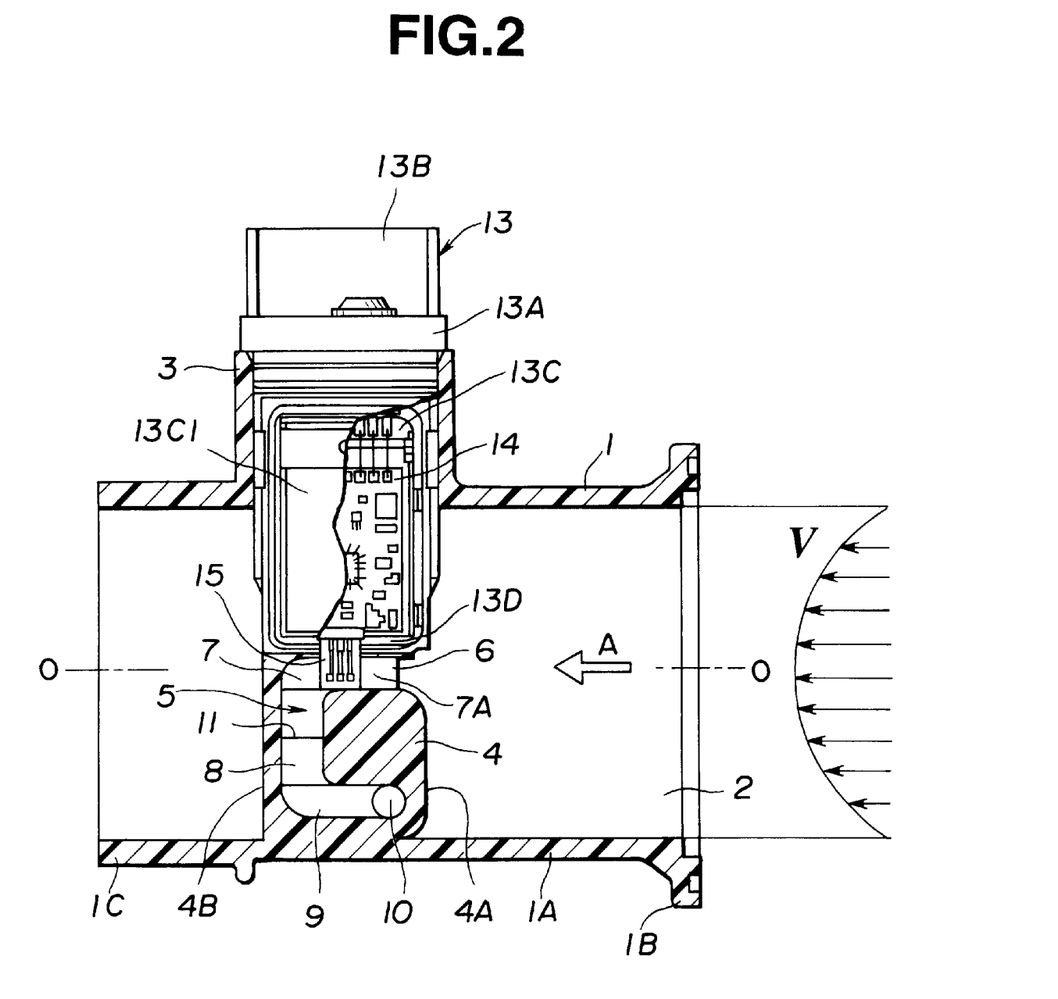
FIG. 2 is a cross-sectional view taken along lines II—II of FIG. 1.
Figure 3:
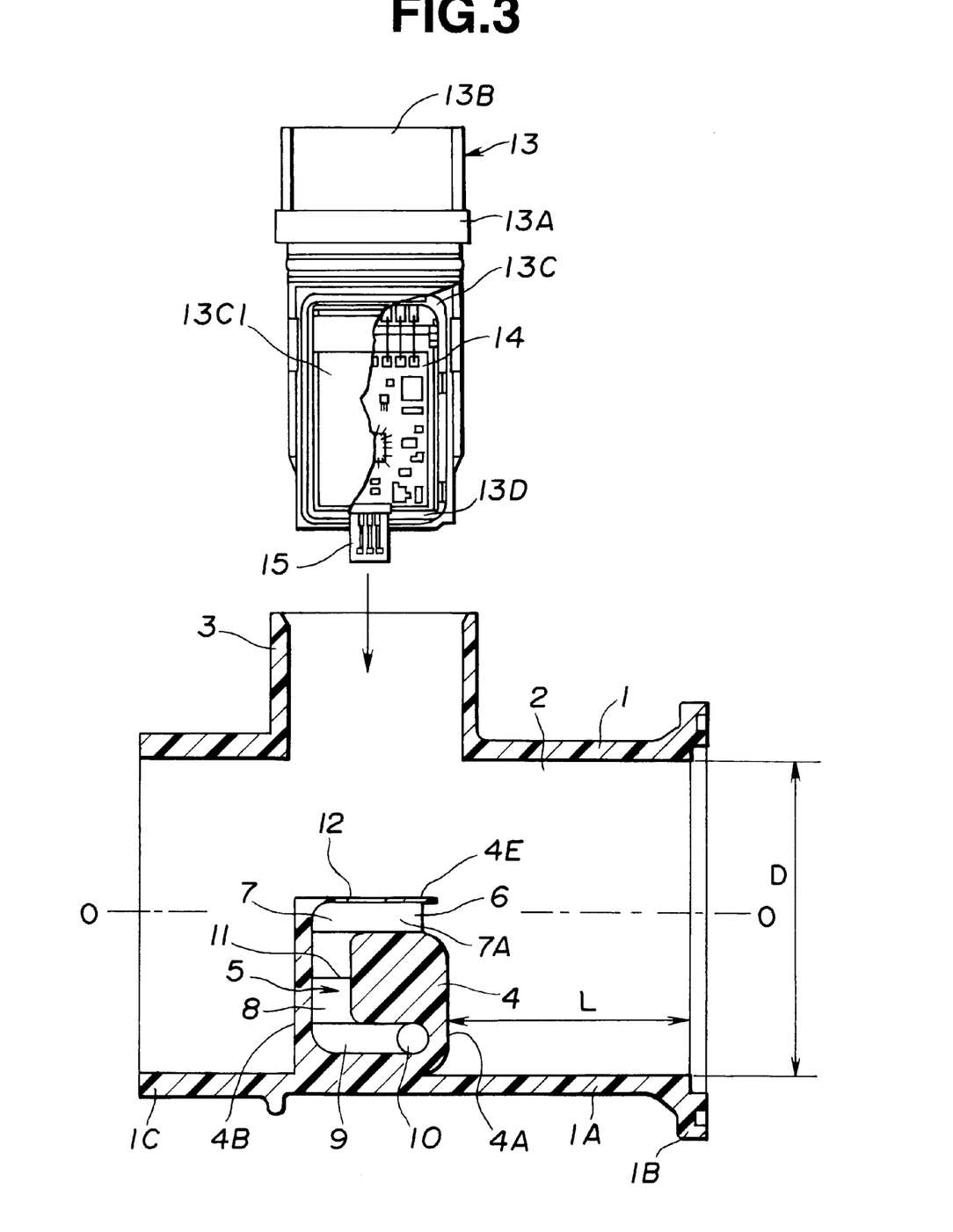
FIG. 3 is an exploded cross-sectional view of FIG. 2.

The flow-rate detection element 15 detects the flow-rate by utilizing the change of the resistance value of the resistance thermometers 19 and 20 in a condition that the resistance thermometers 19 and 20 are cooled by air flow shown by arrow A of FIG. 2. Since the flow-rate detection element 15 is arranged to locate the resistance thermometers 19 and 20 at right and left sides of the heater 18, it can detect both of the flow shown by the arrow A and a reverse-direction flow. Therefore, this flow-rate detection element 15 functions as a flow-direction detecting element.

The manner of operation of the intake-air flow-rate measuring apparatus of the embodiment according to the present invention will be discussed hereinafter.

Part of the intake-air flowing through the passage 2 in the pipe body 1 flows into the bypass passage 5. The intake-air flow-rate measuring apparatus is arranged to detect the flow-rate of the intake air supplied to an engine by detecting a flow-rate of air flowing through the bypass passage 5 by means of the flow-rate detection element 15.

Since the bypass passage 5 has a portion whose passage cross-sectional area So is choked by the passage restricting portion 11 and is smaller than the passage cross-sectional area S1 of the first passage 7, it becomes possible to control the bypass-flow ratio of the air flowing through the bypass passage 5 by the passage cross-sectional area SO so that the flow-rate which always has a constant ratio with respect to the flow-rate of the intake air flowing through the passage 2. Therefore, by detecting the air flow-rate flowing through the bypass passage 5 by means of the flow-rate detection element 15, the air flow-rate flowing through the passage 2 is accurately detected.

Further, by setting the length L of the pipe body 1 upstream of the housing 4 to 0.5 to 2.0 times the diameter D of the pipe body 1 (preferably as same as the diameter of the pipe body 1), the flow characteristics of the intake air in the pipe body 1 is improved.

Since the bypass valve 5 is formed into a U-shape by the first passage 7, the second passage 8 and the third passage 9, it becomes possible to set the length of the bypass passage 5 sufficiently longer than the length of the corresponding portion of the passage 2. This enables the pressure difference between the inlet port 6 and the outlet port to be kept so as to suppress the influence of the pulsated flow generated in the pipe body 1.

Further, the first passage 7 is located in the vicinity of the axial center O—O of the passage 2 and is communicated with the inlet port 6 opening toward the upstream side of the intake air. The third passage 9 is located at a diametrically outer side in the housing 4 and is communicated with the outlet ports 10 and 10 opened at the side surfaced 4C and 4D. As shown in FIG. 2, the flow speed V of the flowing air in the pipe body 1 is varied by each diametrical part, that is, the flow speed V is high in the vicinity of the axial center O—O and is low in the vicinity of the pipe wall 1A. Therefore, a pressure difference is generated between the inlet port 6 and the outlet port 10 such that the air flowed into the bypass passage 5 preferably flows through the bypass passage 5 when the flow direction of the is directed to the engine.

Further, by installing the installation portion 13A of the element supporting member 13 to the installation port 3 of the pipe body 1, the plate-type flow-rate detection element 15 installed at the tip end portion of the element supporting member 13 is located in the first passage 5 of the bypass passage 5 through the element inserting port 12 and is disposed at the upstream side of the passage restricting portion 11. Therefore, when the intake air is flowed in the right direction as shown by the arrow A in FIG. 2, the straitened air flow is supplied to the flow-rate detection element 15. This improves the detection sensibility of the flow rate detected by the flow-rate detection element 15. On the other hand, when the intake air is flowed in the reverse direction of the arrow A of FIG. 2, the passage restricting portion 11 suppresses reverse flow of the intake air is flowing into the flow-rate detection element 15.

Since the element inserting port 12 for the flow-rate detection element 15 is formed into a tapered shape or upside-down V-shape by the oblique surfaces 7A and 7A so as to gradually decrease the passage cross-sectional area, the straitening of the air flow is promoted by increasing the flow speed at the flow-rate detection element 15 in addition to the function of the passage restricting portion 11 formed in the bypass passage 5. This further improves the detection sensibility.

Since the plate-type flow-rate detection element 15 is constituted by installing the thin-film heater 18 and the thin-film resistance thermometers 19 and 20 on the silicon base plate 16 covered with the insulation film 17, the heat capacity of the flow-rate detection element 15 is decreased as compared with that of the conventional bobbin type hot-wire probe. This improves the detection responsibility of the flow-rate detection element 15.

Since the flow-rate detection element 15 is constructed into a right and reverse flow detection element by the installation of the resistance thermometers 19 and 20 disposed at both sides of the heater 18, even if the reverse directional air-flow passes through the bypass passage 5, the flow-rate detection element 15 can detect the flow-rate of the revere directional air-flow.

Further, since the element supporting member 13 is arranged such that the circuit receiving portion 13C for receiving the circuit unit 14 therein is exposed in the passage 2 when the element supporting member 13 is installed to the pipe body 1, the circuit unit 14 is cooled by the intake air flowing through the passage 2. This suppresses the raising of the temperature of the circuit unit 14 and therefore the overlapping of noises onto the electric signal outputted from the circuit unit 14 is decreased.

Figure 13:
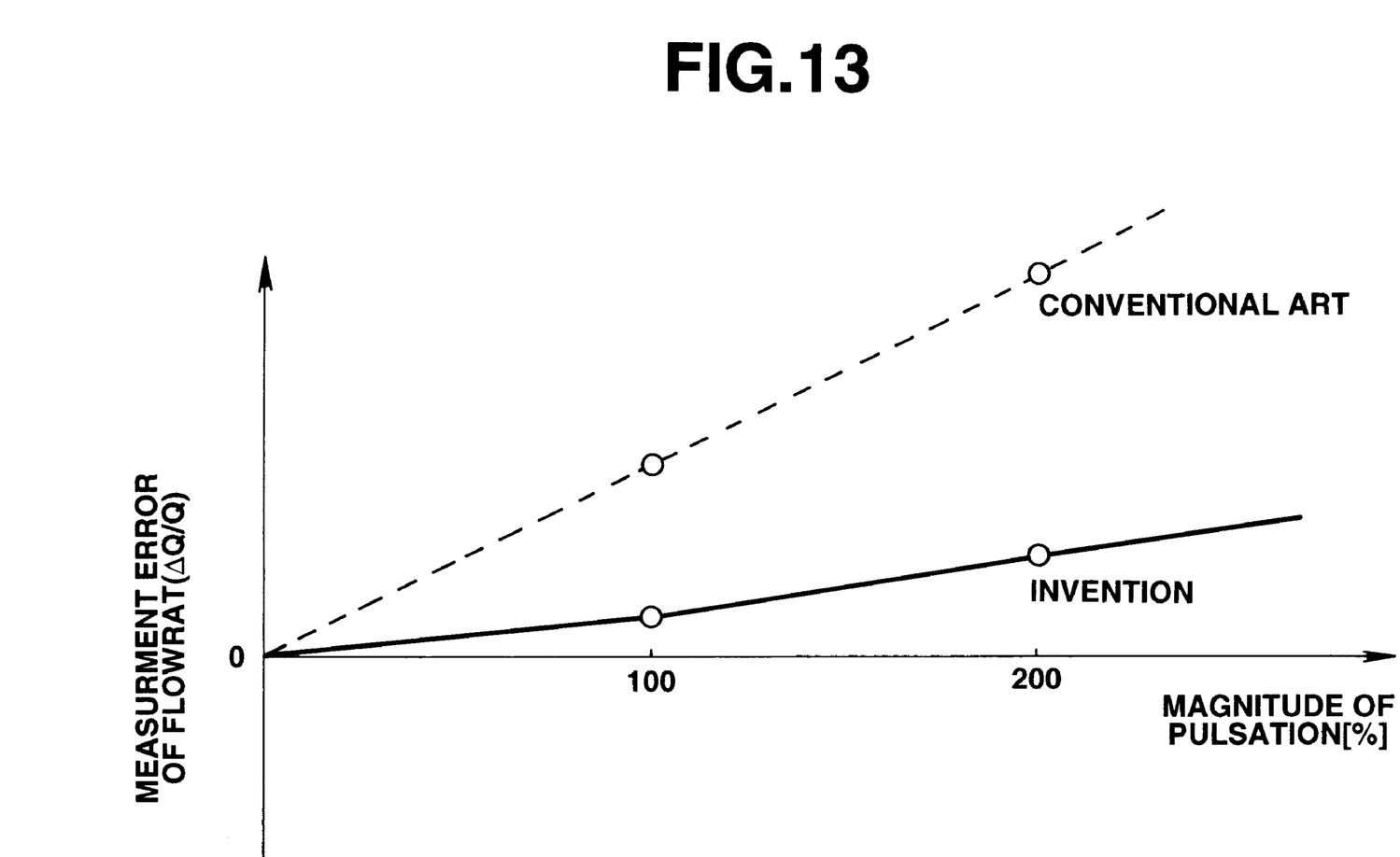
FIG. 13 is a graph which shows a characteristic curve of the flow-rate measuring error of $\Delta Q/Q$ with respect to the magnitude of pulsating flow.

With thus arranged intake air flow-rate measuring apparatus according to the present invention, by the virtue of the length and shape of the bypass passage 5 formed inside of the housing 4, the ratio $\Delta Q/Q$ of the flow-rate measuring error with respect to the magnitude of the pulsation is largely improved as compared with the conventional apparatus, as shown in FIG. 13. This improves the detection accuracy of the intake air flow-rate.

Further, since the apparatus according to the present invention is arranged to decrease the flow-rate flowed into the flow-rate detection element 15 in the reverse flow condition and to use the reverse-flow detectable element as the flow-rate detection element 15, it becomes possible to accurately detect the flow-rate of the reverse flow.

Furthermore, since the plate-type flow-rate detection element 15 is used as a flow-rate detection element, the heat capacity of the flow-rate detection element 15 is reduced as compared with that of the conventional bobbin-type flow-rate detection element. This improves the responsibility as to the flow-rate detection of the intake air.

Since the housing 4 including the bypass passage 5 is integrally formed with the pipe body 1, it becomes possible to form the bypass passage 5 sufficiently long from the inlet port 6 to the outlet ports 10 and 10 and to form the element supporting member 13 into a small size and a separated type. As a result, it becomes possible to cool the circuit unit 14 in the circuit receiving portion 13C by means of the intake air and to execute a stable flow-rate measuring.

Figure 12:
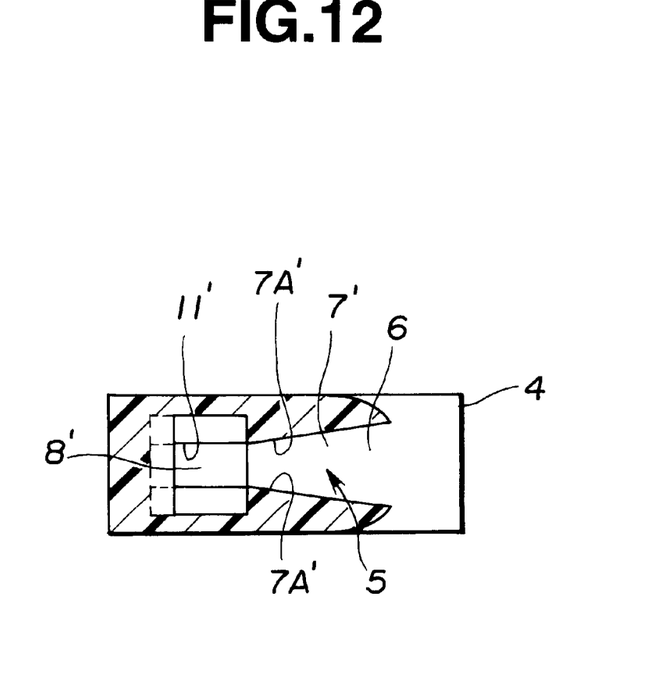
FIG. 12 is a cross-sectional view of a modified bypass passage which cross-sectional view is taken along as is similar to that of FIG. 6.

Although the embodiment according to the present invention has been shown and described such that the housing 4 has the side surfaces of the first passage 7 defined by the oblique surfaces 7A and 7A so as to gradually decrease the passage cross-sectional area as shown in FIG. 6, it will be understood that the housing 4 may be arranged such that a first passage 7' is defined by oblique surfaces 7A' and 7A' so as to decrease the passage cross-sectional area thereof toward a second passage 8' and that the second passage 8' is formed into a square in cross section so as to be greater than the first passage 7' in passage cross-sectional area, as shown in FIG. 12. In this case, the second passage 8' is choked at the portion from the axial center O to a passage restricting portion 11' such that the passage cross-section area thereof is changed from the square to a rectangle.

While the embodiment of the present invention has been shown and described such that the outlet port 10 and 10 of the bypass passage 5 is formed at the right and left surfaces 4C and 4D, it will be understood that the present invention is not limited to this and may be formed such that the outlet port 10 is formed at one of the side surfaces 4C and 4D.

Figure 5:
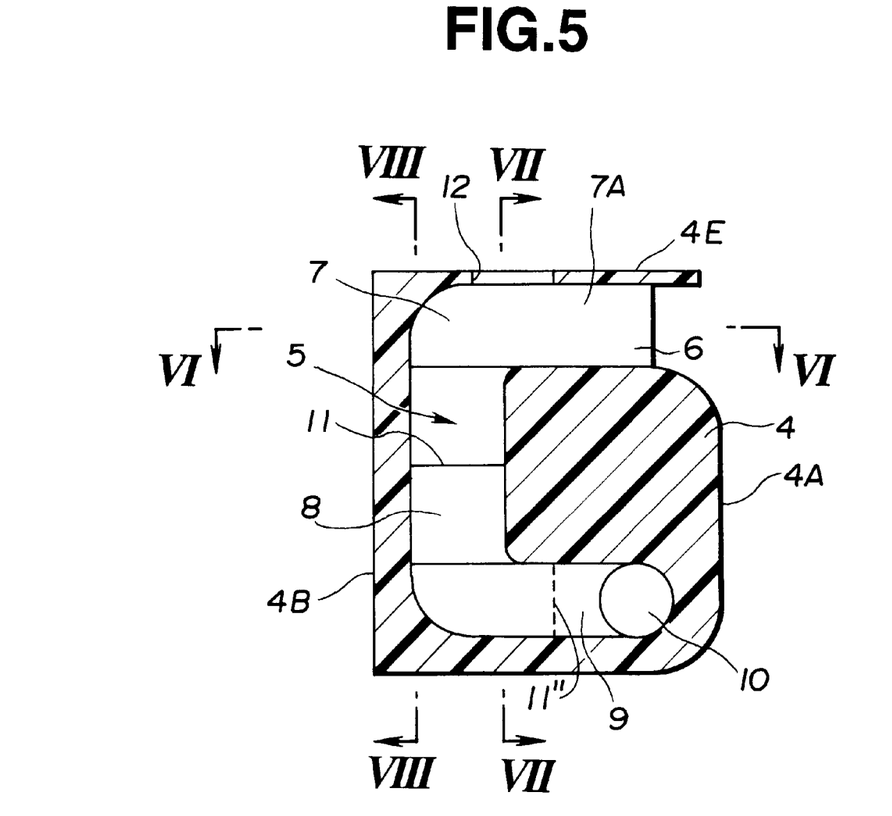
FIG. 5 is a cross sectional view of the housing.

Furthermore, although the embodiment of the present invention has been shown and described such that the passage restricting portion 11 is disposed in the second passage 8 and that the flow-rate detection element 15 is disposed in the first passage 7, it will be understood that the present invention is not limited to this and may be arranged such that the passage restricting portion is formed in the third passage 9, as highlighted in FIG. 5 with dotted element 11 and the flow-rate detection element is disposed in the second passage 8. That is, the flow-rate detection element 15 may be arranged to be disposed upstream of the passage restricting portion. On the other hand, the plate-type flow-rate detection element 15 is not limited to the both directional flow-rate detection element and may be a one-directional flow-rate detection element.

The entire disclosure of Japanese Patent Application No. 8-172954 filed on Jun. 12, 1996 including specification, claims, drawings and summary are incorporated herein by reference in its entirety.

What is claimed is:

1. An apparatus for measuring gas flow rate, comprising:
    a pipe body whose inside space performs as a passage for flowing gas to be measured;
    a housing disposed at an inside space of said pipe body so as to diametrically project from a pipe wall toward a center axis of said pipe body;
    a bypass passage through which part of the gas to be measured flows, said bypass passage being formed in said housing into a generally U-shape and having an inlet port located in the vicinity of a center axis of said pipe body and at least one outlet port located in the vicinity of the pipe wall of said pipe body;
    a passage restricting portion disposed in said bypass passage so as to decrease a passage cross-sectional area of said bypass passage; and
    a flow rate detecting element disposed in said bypass passage and upstream of said passage restricting portion.

2. An apparatus as claimed in claim 1, wherein said at least one outlet port is formed on at least one of side surfaces of said housing.

3. An apparatus as claimed in claim 2, wherein the element supporting member receives a circuit unit for executing a signal communication with said flow-rate detecting element, wherein said circuit unit is at least partially positioned in said pipe body so as to be cooled by the air flowing through said pipe body.

4. An apparatus as claimed in claim 1, further comprising an element supporting member to which said flow-rate detection element is installed and through which said flow-rate detection element is disposed in said bypass passage.

5. An apparatus as claimed in claim 1, wherein said bypass passage includes a first passage, a second passage and a third passage, the first passage being located in the vicinity of the center axis of the pipe body and extended from an upstream to a downstream of said housing along the axial direction, the second passage being extended from the downstream end of the first passage to the pipe wall of said pipe body, the third passage being located in the vicinity of the pipe wall of said pipe body and extending from the second passage toward the upstream side of the pipe body along the axial direction.

6. An apparatus as claimed in claim 5, wherein said passage restricting portion is formed in at least one of the second and third passage, and said flow-rate detection element is formed in the first passage.

7. An apparatus as claimed in claim 1, wherein a passage cross-sectional area at said passage restricting portion is formed smaller than that at a portion of said bypass passage to which said flow-rate detection element has been disposed.

8. An apparatus as claimed in claim 1, wherein said flow-rate detection element is constituted by a silicon base plate, an insulating film and a flow-rate detecting member, the silicon base plate having a worked hole at an intermediate portion in a width direction thereof, the insulating film being formed on the surface of the silicon base plate, and the flow-rate detecting member being formed on the insulating film and at a position opposite to the worked hole by means of film forming.

9. An apparatus as claimed in claim 1, wherein said housing is formed integrally with said pipe body as a unitary construction.

10. An apparatus for measuring gas flow rate, comprising:
    a pipe body whose inside space performs as a passage for flowing gas to be measured;
    a housing disposed at an inside space of said pipe body so as to diametrically project from a pipe wall toward a center axis of said pipe body;
    a bypass passage through which part of the gas to be measured flows, said bypass passage being formed in said housing into a generally U-shape and having an inlet port located in the vicinity of a center axis of said pipe body and at least one outlet port located in the vicinity of the pipe wall of said pipe body;
    a passage restricting portion disposed in said bypass passage so as to decrease a passage cross-sectional area of said bypass passage; and
    a flow rate detecting element disposed in said bypass passage and upstream of said passage restricting portion,
    wherein an inlet portion of said bypass passage is formed into a tapered shape such that a passage cross-sectional area thereof is gradually decreased.

* * * * *